United States Patent
Yano

(10) Patent No.: US 7,436,482 B2
(45) Date of Patent: Oct. 14, 2008

(54) LAMINATED GLASS INCLUDING A LIGHT ADJUSTER WITH AN ELECTRODE STRUCTURE HAVING PARTICULAR THICKNESS

(75) Inventor: Yuichi Yano, Ichihara (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 232 days.

(21) Appl. No.: 11/118,183

(22) Filed: Apr. 28, 2005

(65) Prior Publication Data

US 2005/0190332 A1 Sep. 1, 2005

Related U.S. Application Data

(63) Continuation of application No. PCT/JP2004/011197, filed on Jul. 29, 2004.

(51) Int. Cl.
*G02F 1/1345* (2006.01)
(52) U.S. Cl. .................... 349/152; 349/16; 349/149; 349/150
(58) Field of Classification Search .............. 349/16, 349/13
See application file for complete search history.

(56) References Cited

U.S. PATENT DOCUMENTS

| | | | |
|---|---|---|---|
| 4,749,261 A * | 6/1988 | McLaughlin et al. .......... 349/16 |
| 6,055,088 A | 4/2000 | Fix et al. |
| 6,160,655 A | 12/2000 | Fix et al. |
| 6,822,331 B2 * | 11/2004 | Eytcheson .................. 257/773 |

FOREIGN PATENT DOCUMENTS

| | | |
|---|---|---|
| JP | 58-501631 | 9/1983 |
| JP | H1-75218 | 5/1989 |

(Continued)

OTHER PUBLICATIONS

Machine translation of Ito et al., Japanese Patent Document 06-82810 (Mar. 25, 1994).*

(Continued)

*Primary Examiner*—Andrew Schechter
(74) *Attorney, Agent, or Firm*—Cohen Pontani Lieberman & Pavane LLP

(57) ABSTRACT

There is provided a light adjuster which is capable of improving handleability thereof and preventing the occurrence of operation failure. A light adjuster 103 is comprised of a pair of PET films 109*a* and 109*b* that sandwich a liquid crystal layer 108 therebetween, transparent electrically conductive films 110*a* and 110*b* that are provided on respective facing surfaces of the pair of PET films 109*a* and 109*b*, and an electrode structure provided at one end of the light adjuster 103. The electrode structure is comprised of a connecting base formed of a silver paste 111 that is applied to an exposed part of the transparent electrically conductive film 110*b*, a copper tape 112 that is stuck on the upper surface of the silver paste 111, and a tabular connector 113 made of a metal that is pressed onto the copper tape 112 at one end thereof. A lead line 115 is secured to the other end of the connector 113 by solder 114 to supply power from an external power source. The thickness of the electrode structure is not less than the value of the combined thickness of the liquid crystal layer 108, the transparent electrically conductive film 110*a*, and the PET film 109*a*.

3 Claims, 4 Drawing Sheets

FOREIGN PATENT DOCUMENTS

| | | |
|---|---|---|
| JP | H1-160423 | 11/1989 |
| JP | 2-62518 U * | 5/1990 |
| JP | 4-13925 | 2/1992 |
| JP | 4-116827 U | 10/1992 |
| JP | 06-079490 A | 3/1994 |
| JP | 6-82810 A | 3/1994 |
| JP | 6082810 | 3/1994 |
| JP | 06-037395 | 9/1994 |
| WO | WO 83/01016 | 3/1983 |

OTHER PUBLICATIONS

Search Report dated Jul. 25, 2006 for the corresponding European Application No. EP 04 77 1225.

English Translation of Japanese Office Action from corresponding Japanese Patent Application No. 2003-202874.

* cited by examiner

--PRIOR ART--

--PRIOR ART--

LAMINATED GLASS INCLUDING A LIGHT ADJUSTER WITH AN ELECTRODE STRUCTURE HAVING PARTICULAR THICKNESS

RELATED APPLICATION

This application is a U.S. Continuation Application of International Application PCT/JP2004/011197 filed Jul. 29, 2004.

TECHNICAL FIELD

The present invention relates to a light adjuster and a laminated glass having a liquid crystal material therein, and in particular relates to a light adjuster and a laminated glass that enables visual field control.

BACKGROUND ART

Hitherto, electrochromic devices (hereinafter referred to as "EC devices") have been known as devices such as light adjusters having a light adjusting capability of enabling the transmissivity to be freely adjusted (hereinafter referred to as "light adjusting devices"). Such an EC device is, for example, made from a material that undergoes a spectral change upon an electrochemical redox reaction, such as tungsten oxide or prussian blue, and controls the transmitted light by absorbing light. However, because such an EC device is current driven, if the EC device is made to have a large area, then a large voltage drop arises, the response speed drops markedly, and degradation of constituent materials due to electrochemical changes and so on occurs during prolonged passing of a current; such an EC device thus cannot be used as a light adjuster that is required to be durable.

In recent years, voltage driven light adjusting devices have thus been used in a laminated glass instead of such current driven EC devices. For example, nematic curvilinear aligned phase (NCAP) liquid crystal light adjusters are known as such voltage driven light adjusting devices. Such a nematic liquid crystal light adjuster is made from a liquid crystal material, and has excellent durability, and can easily be made to have a large area (see, for example, Japanese Laid-Open Patent Publication (Kohyo) No. S58-501631).

As shown in FIG. 3, in general, such a light adjuster 30 is comprised of a liquid crystal layer 33 having a light adjusting function in which a plurality of voids 31 are filled with nematic liquid crystalline rod-like molecules 32 (hereinafter referred to as "liquid crystal molecules"), and a pair of PET films 34 that sandwich the liquid crystal layer 33 therebetween; transparent electrically conductive films 35 are provided on facing surfaces of the PET films 34 so as to be bonded to the liquid crystal layer 33, and a voltage is applied to the liquid crystal layer 33 via this pair of transparent electrically conductive films 35. The liquid crystal layer 33 is formed of a transparent polymer film 36 having a plurality of voids 31 therein, and each void 31 is filled with liquid crystal molecules 32 so as to form a liquid crystal capsule 37.

According to this light adjuster 30, when a voltage is not being applied, the liquid crystal molecules 32 line up along the curved wall surfaces of the liquid crystal capsules 37, and are thus not arranged along the direction of travel of light transmitted through the liquid crystal capsules 37; the optical path of the transmitted light thus meanders around, and incident light is scattered at boundary layers between the liquid crystal capsules 37 and the polymer film 36, and hence the liquid crystal layer 33 becomes cloudy. On the other hand, when a voltage is applied, the liquid crystal molecules 32 line up along the direction of the electric field produced. At this time, if the liquid crystal layer 33 is made from a material such that the ordinary refractive index $n_o$ of the liquid crystal molecules 32 matches the refractive index $n_p$ of the polymer film 36, it becomes such that boundary layers between the liquid crystal capsules 37 and the polymer film 36 do not exist optically, and hence light incident on the liquid crystal layer 33 can be transmitted unhindered, whereby the liquid crystal layer 33 becomes transparent.

Due to the above principle, the light adjuster 30 has a visual field controlling capability of shutting off the visual field through scattering of incident light when a voltage is not being applied, and securing the visual field through allowing incident light to be transmitted unhindered when a voltage is being applied.

As shown in FIG. 4, the light adjuster 30 has an electrode structure provided at one end of the light adjuster 30 where the liquid crystal layer 33, the transparent electrically conductive film 35a and the PET film 34a are partially cut off, and is comprised of a silver paste 40 applied on an exposed part of the transparent electrically conductive film 35b, and a pin connector 41 that is pressed onto the upper surface of the silver paste 40. The pin connector 41 has an extension 41a which extends in the form of a tongue, and a lead wire 43 is coupled to the extension 41a by solder 42 (see, for example, Japanese Utility Model Application Publication (Kokoku) No. H6-37395).

The electrode structure of the light adjuster 30 is exposed to the outside since it is not covered by the PET film 34a as described above. With this electrode structure, when the light adjuster 30 is used in a laminated glass and is fitted into a window frame, the electrode structure is swallowed into a sash or the like, and thus it was conventionally considered that there is no necessity to cover the light adjuster 30 with a glass sheet or the like of the laminated glass. However, recently, from the view point of improving handleability of a laminated glass using the light adjuster 30 when mounting the glass into a window frame, there is a demand for covering this electrode structure with a glass sheet or the like.

However, in the above described electrode structure, the total thickness of the parts which need to be covered by a glass sheet or the like, that is, the silver paste 40 and the pin connector 41, is less than the total thickness of the liquid crystal layer 33, the PET film 34a and the transparent electrically conductive film 35a. Due to this, when preparing a laminated glass, stress due to the pushing pressure on the glass sheet is concentrated on the part of the light adjuster where the transparent electrically conductive film 35a and the PET film 34a are partially cut off. Consequently, the transparent electrically conductive film 35a and the PET film 34a are bent toward the transparent electrically conductive film 35b and the PET film 34b, causing the transparent electrically conductive film 35a and the transparent electrically conductive film 35b to contact each other and electrically short-circuit. As a result, there is a problem that operation failure occurs with the light adjuster 30.

The present invention has been devised in view of the above-described problems, and it is an object of the present invention to provide a light adjuster and a laminated glass which are capable of improving handleability thereof and prevent the occurrence of operation failure of the light adjuster.

DISCLOSURE OF THE INVENTION

To attain the above object, in a first aspect of the present invention, there is provided a light adjuster including a liquid crystal layer having a plurality of voids therein, each of the voids being filled with a liquid crystal material, a pair of substrates that sandwich the liquid crystal layer therebetween, at least one of the substrates being transparent, and transparent electrically conductive films provided on respective facing surfaces of the substrates, to which power is supplied from outside via wiring, characterized in that the light adjuster comprises an electrode structure formed of a connecting part connected to the wiring, and a connecting base that is interposed between the connecting part and one of the transparent electrically conductive films, and the electrode structure has a thickness not less than a value of a combined thickness of the liquid crystal layer, the other transparent electrically conductive film, and the substrate on which the other transparent electrically conductive film is provided.

In this aspect, preferably the connecting part is formed of a metallic mesh that is soaked with solder.

In this aspect, preferably the connecting base is formed of an electrically conductive paste applied to the one electrically conductive film, and an electrically conductive tape that is stuck on the electrically conductive paste.

To attain the above object, in a second aspect of the present invention, there is provided a light laminated glass including a pair of glass sheets facing each other, intermediate layers provided on respective facing surfaces of the pair of glass sheets, and a light adjuster sandwiched between the intermediate layers, characterized in that the light adjuster comprises a liquid crystal layer having a plurality of voids therein, each of the voids being filled with a liquid crystal material, a pair of substrates that sandwich the liquid crystal layer therebetween, at least one of the substrates being transparent, transparent electrically conductive films provided on respective facing surfaces of the substrates, to which power is supplied from outside via wiring, and an electrode structure formed of a connecting part connected to the wiring, and a connecting base that is interposed between the connecting part and one of the transparent electrically conductive films, and the electrode structure has a thickness not less than a value of a combined thickness of the liquid crystal layer, the other transparent electrically conductive film, and the substrate on which the other transparent electrically conductive film is provided, and not more than a value of a combined thickness of the liquid crystal layer, the other transparent electrically conductive film, the substrate on which the other transparent electrically conductive film is provided, and the intermediate layer.

BEST MODE FOR CARRYING OUT THE INVENTION

A light adjuster according to a first embodiment of the present invention will now be described with reference to the drawings.

Figure 1:
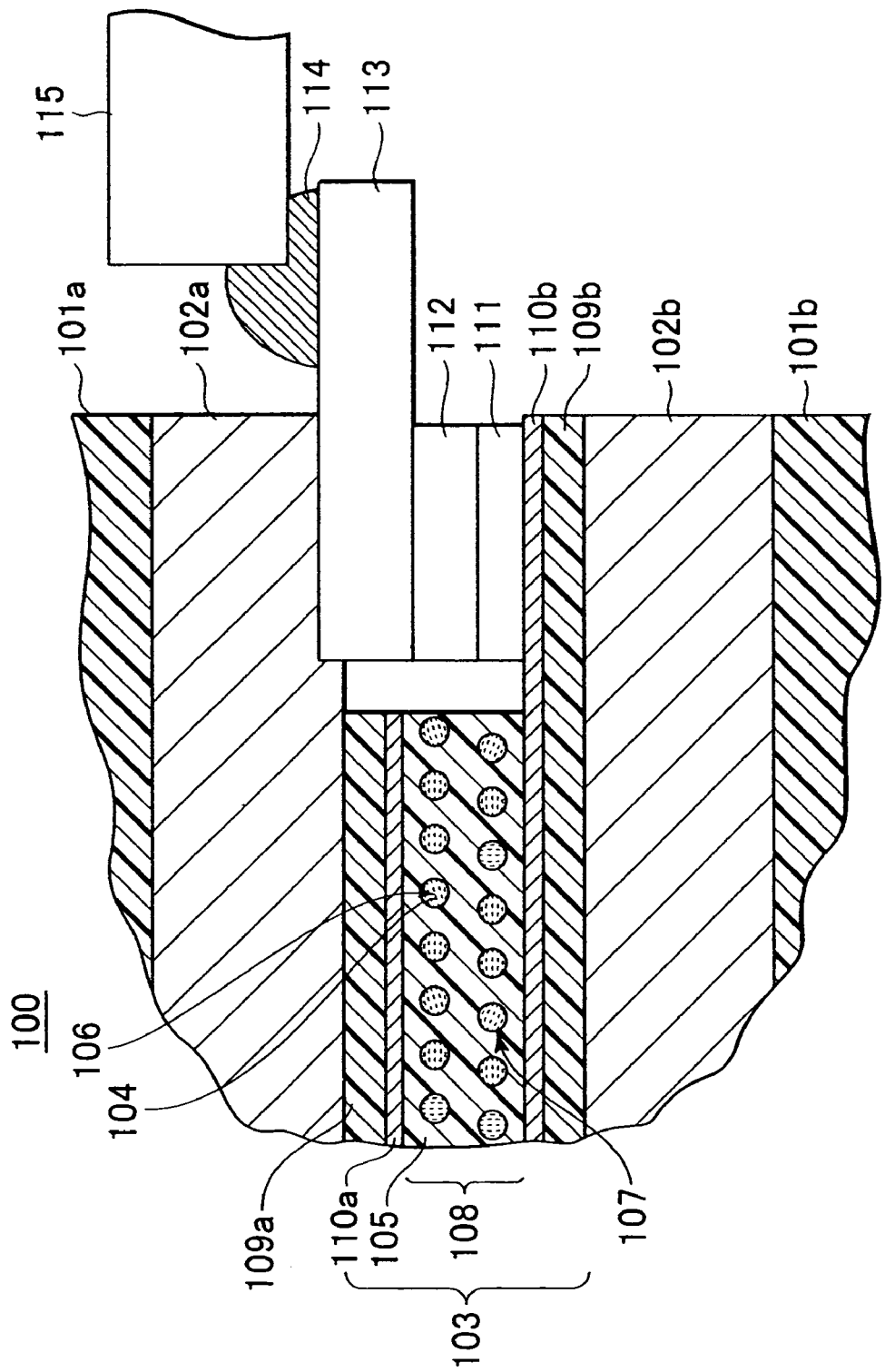
FIG. 1 is a sectional view of the schematic construction of a laminated glass using a light adjuster according to a first embodiment of the present invention.

FIG. 1 is a sectional view of the schematic construction of a laminated glass using the light adjuster according to the first embodiment of the present invention.

In FIG. 1, the laminated glass 100 is comprised of a pair of glass sheets 101a and 101b that are disposed in facing relation to each other, transparent intermediate layers 102a and 102b provided on respective facing surfaces of the glass sheets 101a and 101b that are formed of, for example, EVA (copolymer of ethylene vinyl acetate), and a light adjuster 103, described below, that is sandwiched between the intermediate layers 102a and 102b.

The light adjuster 103 is comprised of a liquid crystal layer 108 formed of a transparent polymer film 105 made of a latex having a plurality of voids 104 therein, and liquid crystal capsules 107 formed of liquid crystal molecules 106 being filled in the voids 104, a pair of PET films (substrates) 109a and 109b that sandwich the liquid crystal layer 108 therebetween, and transparent electrically conductive films 110a and 110b that are provided on respective facing surfaces of the pair of PET films 109a and 109b. Further provided at one end of the light adjuster 103 is an electrode structure, described below, which is provided on a part of the transparent electrically conductive film 110b which is exposed with the liquid crystal layer 108, the transparent electrically conductive film 110a and the PET film 109a being partially cut off.

This electrode structure includes a connecting base formed of a silver paste 111 that is applied to the exposed part of the transparent electrically conductive film 110b and a copper tape 112 that is stuck on the upper surface of the silver paste 111, and a tabular connector (connecting part) 113 formed, for example, of a metal such as copper, that is pressed onto the copper tape 112 at one end thereof while the other end protrudes from the periphery of the laminated glass 100. A lead line (wiring) 115 is secured to the connector 113 by solder 114 to supply power from an external power source, not shown.

Further, the light adjuster 103 includes an electrode structure, not shown, having a similar construction to the above-described electrode structure, that is provided on an exposed part of the transparent electrically conductive film 110a at the other end of the light adjuster 103.

With the light adjuster 103, power supplied by the lead line 115 is transmitted to the transparent electrically conductive films 110a and 110b via the solder 114, the connector 113, the copper tape 112 and the silver paste 111, and the transparent electrically conductive films 110a and 110b apply voltage to the liquid crystal layer 108.

According to the light adjuster 103, when a voltage is not being applied to the liquid crystal layer 108, the liquid crystal molecules 106 line up along the curved wall surfaces of the liquid crystal capsules 107, the optical path of the transmitted light thus meanders around, and incident light is scattered at boundary layers between the liquid crystal capsules 107 and the polymer film 105, and hence the liquid crystal layer 108 becomes cloudy. On the other hand, according to this light adjuster 103, when a voltage is applied to the liquid crystal layer 108, the liquid crystal molecules 106 line up along the direction of the electric field produced, and at this time, due to the liquid crystal layer 108 being made from a material such that the ordinary refractive index $n_o$ of the liquid crystal molecules 106 matches the refractive index $n_p$ of the polymer film 105, it becomes such that boundary layers between the liquid crystal capsules 107 and the polymer film 105 do not exist optically, and hence light incident on the liquid crystal layer 108 can be transmitted unhindered, whereby the liquid crystal layer 108 becomes transparent.

Further, in the light adjuster 103, related component parts are adjusted in thickness such that the value of the combined thickness of the silver paste 111, the copper tape 112, and the connector 113 is not less than the value of the combined thickness of the liquid crystal layer 108, the transparent electrically conductive film 110a, and the PET film 109a, for example, the former combined thickness value is 220 μm. Further, the component parts are adjusted in thickness such that the value of the combined thickness of the silver paste 111, the copper tape 112, and the connector 113 is not more than the value of the combined thickness of the liquid crystal layer 108, the transparent electrically conductive film 110a, the PET film 109a, and the intermediate layer 102a.

The light adjuster according to the first embodiment includes an electrode structure comprised of the connector 113 that is connected to the lead line 115 via the solder 114, and the silver paste 111 and the copper tape 112 that are interposed between the connector 113 and the transparent electrically conductive film 110b. The value of the combined thickness of the silver paste 111, the copper tape 112, and the connector 113 is not less than the value of the combined thickness of the liquid crystal layer 108, the transparent electrically conductive film 110a, and the PET film 109a, and at the same time, the value of the combined thickness of the silver paste 111, the copper tape 112, and the connector 113 is not more than the value of the combined thickness of the liquid crystal layer 108, the transparent electrically conductive film 110a, the PET film 109a, and the intermediate layer 102a. Due to this, stress caused by the pushing pressure on the glass sheet 101a is not concentrated on the part of the light adjuster where the transparent electrically conductive film 110a is partially cut off, whereby operation failure of the light adjuster 103 can be prevented. At the same time, even if the intermediate layer 102a of the electrode structure is totally crushed, the silver paste 111, the copper tape 112 and the connector 113 will never push upward the end portion of the glass sheet 101a, and thus occurrence of a crack of the glass sheet 101a of the laminated glass 100 can be prevented.

Further, in the light adjuster 103, the silver paste 111 is applied to the transparent electrically conductive film 110b, and the copper tape 112 is stuck on the paste-applied silver paste 111. As a result, the surface of the transparent electrically conductive film 10b becomes smooth and the adhesive strength of the copper tape 112 can be improved, whereby it is possible to reliably secure electrical conduction in the electrode structure.

Next, a description will be given of a light adjuster according to a second embodiment of the present invention with reference to the drawings.

Figure 2:
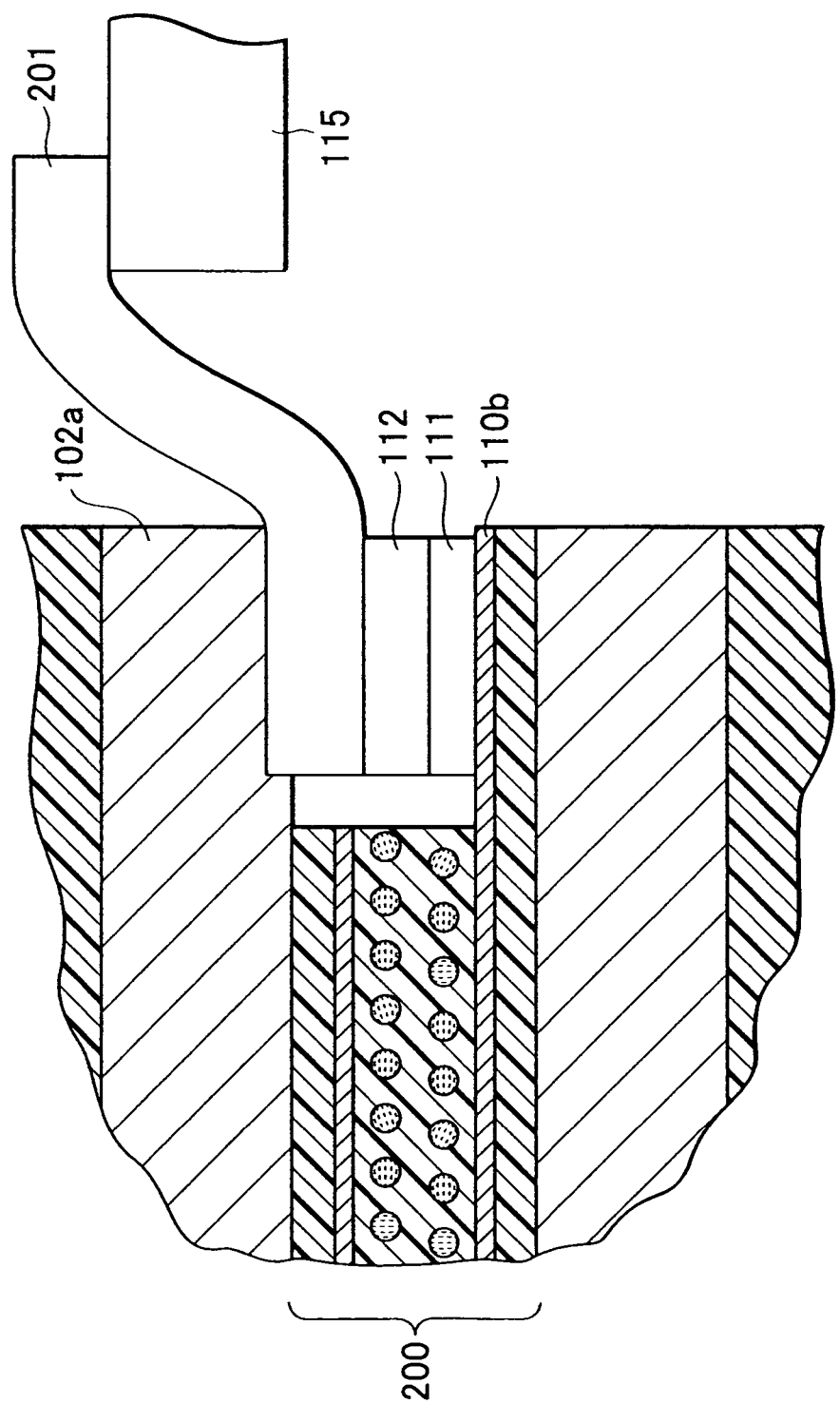
FIG. 2 is a sectional view of the schematic construction of a laminated glass using a light adjuster according to a second embodiment of the present invention.
Figure 3:
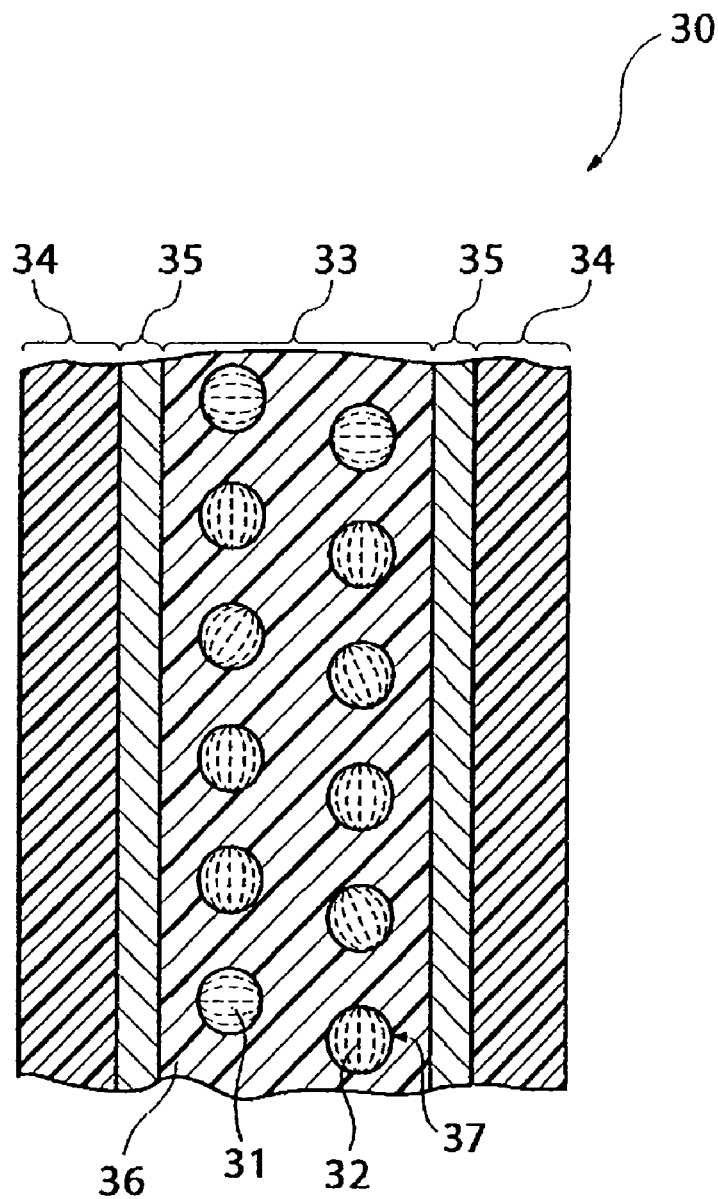
FIG. 3 is a sectional view of the schematic construction of a conventional light adjuster.
Figure 4:
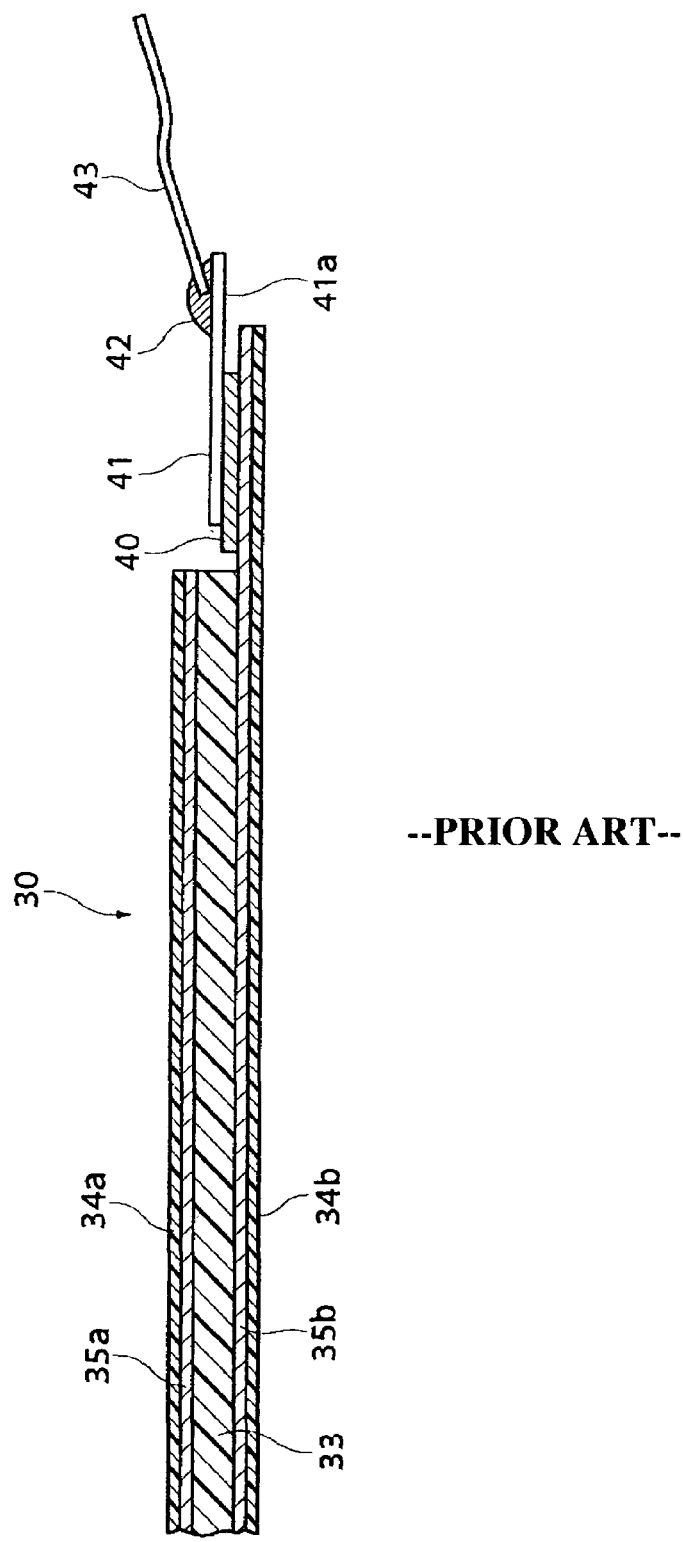
FIG. 4 is a sectional view of the schematic construction of the electrode structure of the conventional light adjuster.

FIG. 2 is a sectional view of the schematic construction of a laminated glass using the light adjuster according to the second embodiment of the present invention.

In the second embodiment, the construction and operation are basically the same as those of the first embodiment described above and thus description of parts of the construction and operation which are redundant is omitted, and a description will be given of parts of the construction and operation which differ from the first embodiment.

In FIG. 2, the light adjuster 200 includes an electrode structure comprised of a connecting base formed of the silver paste 111 that is applied to an exposed part of the transparent electrically conductive film 110b at one end of the light adjuster 200, and the copper tape 112 that is stuck on the upper surface of the silver paste 111, and a connector (connecting part) 201 in the form of a strip formed of a metallic mesh that is interposed between the copper tape 112 and the intermediate layer 102a and is soaked with solder. With the soaked solder being melted, the connector 201 becomes secured at one end thereof to the copper tape 112, and the other end becomes secured to the lead line 115 that supplies power from an external power source, not shown.

As in the first embodiment, the light adjuster 200 has a similar electrode structure on an exposed part of the transparent electrically conductive film 10b at the other end of the light adjuster 200.

According to the light adjuster of the second embodiment, the connector 201 is formed of a metallic mesh that is soaked with solder. Thus, when the light adjuster 200 is used in the laminated glass 100, even if a part of the connector 201 is made to protrude from the periphery of the laminated glass 100 in order to make the connector 201 and the lead line 115 contact each other, the part which protrudes can freely bend and will not interfere with other parts. Therefore, the handleability of the laminated glass 100 using the light adjuster 200 can be improved.

In the light adjusters of the first and second embodiments described above, the silver paste 111 is applied to the exposed part of the transparent electrically conductive film 110. However, the paste which is to be applied is not limited to this, and may be of any material which has electrical conductivity and can smooth the surface of the transparent electrically conductive film 110 when it hardens.

Further, with the light adjusters of the first and second embodiments described above, the copper tape 112 is stuck on the silver paste 111. However, the material which is to be stuck on the silver paste 111 is not limited to this, and may be of any material which has electrical conductivity as well as adhesive strength, and may be, for example, a metal plate having electrical conductivity as well as adhesive strength.

Still further, with the light adjusters of the first and second embodiments described above, the connecting base is formed of the silver paste 111 and the copper tape 112. However, there is no limitation on the number of members which form the connecting base, and for example, the connecting base may be formed of a single member which absorbs undulations of the surface of the transparent electrically conductive film 110 and has electrical conductivity.

INDUSTRIAL APPLICABILITY

According to the light adjuster of the present invention, the light adjuster has an electrode structure formed of a connecting part connected to wiring, and a connecting base that is interposed between the connecting part and one of transparent electrically conductive films, the thickness of the electrode structure being not less than the value of the combined thickness of the liquid crystal layer, the other transparent electrically conductive film, and the substrate on which the other transparent electrically conductive film is provided. Therefore, when the light adjuster is used in a laminated glass, stress caused by the pushing pressure on the glass sheet is not concentrated on the part of the light adjuster where the other transparent electrically conductive film is partially cut off, whereby operation failure of the light adjuster can be prevented.

Further, according to the light adjuster of the present invention, the connecting part is formed of a metallic mesh that is soaked with solder. Thus, when the light adjuster is used in a laminated glass, even if a part of the connecting part is made to protrude from the periphery of the laminated glass in order to make the connecting part and the lead line 115 contact each other, the part which protrudes can freely bend and will not interfere with other parts. Therefore, the handleability of the laminated glass using the light adjuster can be improved.

According to the light adjuster of the present invention, the connecting base is formed of an electrically conductive paste applied to one of the electrically conductive films, and an electrically conductive tape that is stuck on the electrically conductive paste. Therefore, the surface of the one transparent electrically conductive film becomes smooth and the adhesive strength of the electrically conductive tape can be improved. As a result, it is possible to reliably secure electrical conduction in the electrode structure.

According to the laminated glass of the present invention, the laminated glass includes a pair of glass sheets facing each other, intermediate layers provided on respective facing surfaces of the pair of glass sheets, and a light adjuster sandwiched between the intermediate layers, characterized in that the light adjuster comprises a liquid crystal layer having a plurality of voids therein, each of the voids being filled with a liquid crystal material, a pair of substrates that sandwich the liquid crystal layer therebetween, at least one of the substrates being transparent, transparent electrically conductive films provided on respective facing surfaces of the substrates, to which power is supplied from outside via wiring, and an electrode structure formed of a connecting part connected to the wiring, and a connecting base that is interposed between the connecting part and one of the transparent electrically conductive films, and the electrode structure has a thickness not less than a value of a combined thickness of the liquid crystal layer, the other transparent electrically conductive film, and the substrate on which the other transparent electrically conductive film is provided, and not more than a value of a combined thickness of the liquid crystal layer, the other transparent electrically conductive film, the substrate on which the other transparent electrically conductive film is provided, and the intermediate layer. Therefore, stress caused by the pushing pressure on the glass sheet is not concentrated on the part of the light adjuster where the other transparent electrically conductive film is partially cut off, whereby operation failure of the light adjuster can be prevented. At the same time, the electrode structure will not push upward the end portion of the glass sheet, and thus occurrence of a crack of the glass sheet of the laminated glass can be prevented.

The invention claimed is:

1. A laminated glass including a pair of glass sheets facing each other, intermediate layers provided on respective facing surfaces of said pair of glass sheets, and a light adjuster sandwiched between said intermediate layers, wherein said light adjuster comprises a liquid crystal layer having a plurality of voids therein, each of said voids being filled with a liquid crystal material, a pair of substrates that sandwich said liquid crystal layer therebetween, at least one of said substrates being transparent, transparent electrically conductive films provided on respective facing surfaces of said substrates, to which power is supplied from outside via wiring, and an electrode structure formed of a connecting part connected to the wiring, and a connecting base that is interposed between said connecting part and one of said transparent electrically conductive films; and said electrode structure has a thickness that is more than a value of a combined thickness of said liquid crystal layer, the other transparent electrically conductive film, and said substrate on which said other transparent electrically conductive film is provided, and not more than a value of the combined thickness of said liquid crystal layer, the other transparent electrically conductive film, said substrate on which said other transparent electrically conductive film is provided, and said intermediate layer.

2. A laminated glass as claimed in claim 1, wherein said connecting part is formed of a metallic mesh that is soaked with solder.

3. A laminated glass as claimed in claim 1, wherein said connecting base is formed of an electrically conductive paste applied to said electrically conductive film, and an electrically conductive tape that is stuck on said electrically conductive paste.

* * * * *